Figure 1:
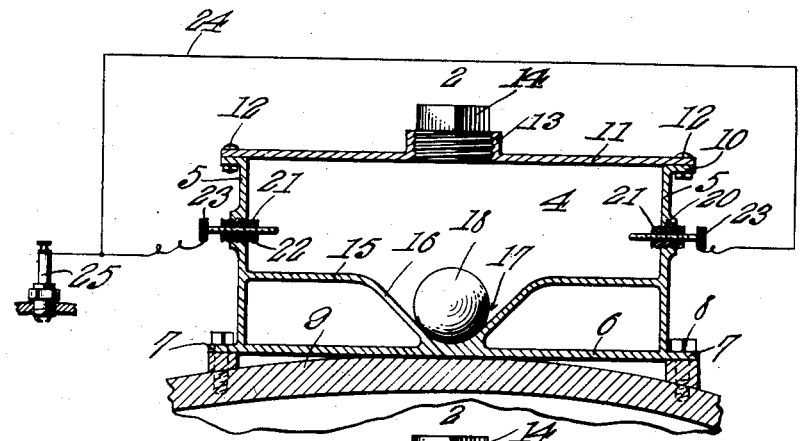

W. E. BARD.
AUTOMATIC IGNITION GROUNDER FOR MOTOR CYCLES.
APPLICATION FILED NOV. 21, 1913.

1,107,245.  Patented Aug. 18, 1914.

Witnesses  W. E. Bard, Inventor
by C. A. Snow & Co.
Attorneys

UNITED STATES PATENT OFFICE.

WALTER EDWARD BARD, OF CLARKSVILLE, TENNESSEE.

AUTOMATIC IGNITION-GROUNDER FOR MOTOR-CYCLES.

1,107,245.  Specification of Letters Patent.  Patented Aug. 18, 1914.

Application filed November 21, 1913. Serial No. 802,284.

*To all whom it may concern:*

Be it known that I, WALTER E. BARD, a citizen of the United States, residing at Clarksville, in the county of Montgomery and State of Tennessee, have invented a new and useful Automatic Ignition-Grounder for Motor-Cycles, of which the following is a specification.

This invention relates to an automatic ignition grounder for motorcycles.

An object of the present invention is to provide a device which will instantly ground the ignition to thereby stop the engine of a motorcycle when the latter is overturned.

A further object is to provide a device to which the ignition wires of a motorcycle are connected and which is to be secured to a motorcycle so that when the latter is in its normal upright position the wires will be maintained out of electrical connection, but, however, should the motorcycle become overturned, thus swinging the entire device out of its normal position, the said wires will be grounded to instantly stop the motor.

A further object is to provide a metallic receptacle in which is placed a mobile element and which is adapted to come in contact with insulated screws the latter being connected to the spark plug so that the same will be grounded when tilted from its normal upright position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 2:
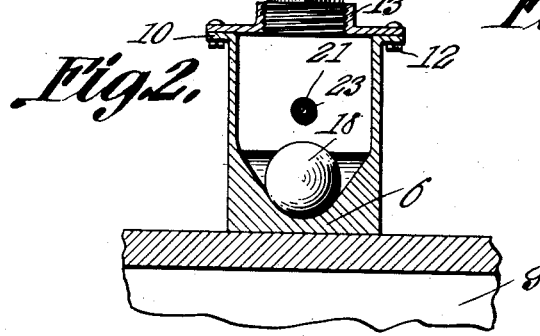
Figure 3:
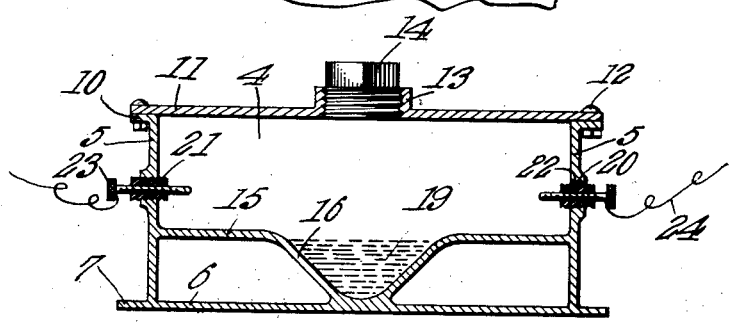

Figure 1 is a longitudinal sectional view of my improved device as attached to the frame of a motorcycle. Fig. 2 is a cross sectional view thereof taken through the center of Fig. 1. Fig. 3 is a longitudinal sectional view of my device in which the mobile element is in the nature of a conducting liquid such as mercury.

Referring to the drawings in which similar reference numerals designate corresponding parts throughout the several views, a box-like receptacle is formed with the metallic side walls 4, end walls 5, and bottom 6. The bottom is provided with the outstanding flange 7 through which suitable retaining bolts 8 extend whereby the entire device may be securely bolted to a bar 9 which in the present instance is a portion of a tube of a motorcycle frame. The side and end walls are provided with the outstanding flange 10 to which the lid 11 is secured by the bolts 12. The lid 11 is provided with the central upstanding rim 13 which is internally threaded for the reception of the plug 14 therein. The upstanding rim 13 and plug 14 provide an entrance to the receptacle so that the mobile element either in the form of a liquid or a solid may be introduced within the receptacle or removed therefrom. Extending between the side walls 4 is the partition 15 which is also secured to the end walls 5 and at the juncture therewith is raised some little distance above the bottom 6. The central portion of the partition extends downwardly as at 16 to form what is termed the well 17. Positioned within the said well is a mobile element which as illustrated in Figs. 1 and 2 may be formed of a single metal sphere 18, a liquid conductor such as mercury and as illustrated at 19 in Fig. 3, or it may be a plurality of small shot or allied material. The end walls 5 are provided with the threaded apertures 20 extending therethrough which apertures are spaced a distance above the partition 15. Extending through the threaded aperture 20 is an insulating bushing 21, the latter being provided with the central threaded aperture 22 extending therethrough and through which extends the metallic screw 23 which projects some little distance beyond the bushing. A wire 24 connects with the screws 23 and lead to the insulated portion of the spark plug diagrammatically represented at 25. The entire receptacle being formed of metal and bolted to the frame is necessarily grounded as is also the one wire of the high tension current which leads to the spark plug.

In operation the longitudinal axis of the device which passes through the oppositely disposed screws 23 is placed at right angles to the longitudinal axis of the motorcycle so that should for any reason the motorcycle fall to either side the mobile element will be displaced from the well 17 and will flow or move into contact with the screws 23 so as to form an electrical connection between the screws and partition 15 and remaining portion of the receptacle so that the insulated portion of the spark plug will be accordingly grounded to thereby prevent a spark from jumping across the terminals of the spark plug which would cause the ignition of the gas within the cylinders. Thus should the motorcycle become overturned with the rider pinned therebeneath, the engine will be immediately stopped which will avoid any possibility of the operator becoming mutilated by the operation of the engine. Also the likelihood of an explosion taking place is materially lessened as the engine being immediately stopped there will be no live exhaust gases escaping from the engine which easily ignite the fuel as it flows from the overturned tank.

From the foregoing it will be apparent that if the vehicle, which may be a motorcycle, aeroplane, or allied mechanism, becomes overturned the spark plug will be shunted and a closed circuit providing for the sparking current thus preventing the occurrence of electric sparks at any point throughout the electric circuit. Thus a high tension coil or magneto may be used and the instant the vehicle overturns the spark plug will be shunted, which is the same as saying that a closed and complete circuit will be provided for the sparking current.

A further feature of applicant's device resides in the fact that slight tilting of the vehicle as will necessarily occur during the operation thereof, will not displace the mobile element in the well due to the manner in which the side walls of the well are formed. However, should the vehicle overturn or assume such position other than it may assume with safety, the mobile element will pass from the well up upon the partition and into contact with the electric terminal, effecting an electric circuit therewith. After the mobile element has been once displaced, it will assume its position closing the electric circuit until such time as the vehicle is completely righted. In this connection it is to be noted that the term "mobile element" is used in a broad sense and refers with equal force to the ball 18 or the liquid 19.

Having thus described my invention, what I claim is:—

1. The combination with the electric circuit of an internal combustion engine of a tiltable vehicle, of means electrically connected to the insulated portion of the spark plug and to the grounded portion thereof adapted to shunt said spark plug during abnormal tilted positions of the vehicle.

2. A receptacle provided with a normally extending substantially horizontal partition, said partition provided with a central well with inclined side walls, a mobile element disposed within said well, insulated contacts carried by the receptacle and adapted to be brought into electric connection therewith by said mobile element, the said well preventing the escapement of said mobile element therefrom during slightly abnormal conditions, and the horizontal portions of said partition preventing the return of said mobile element to said well until normal and horizontal positions are attained.

In testimony that I claim the foregoing as my own, I have hereto affixed my signature in the presence of two witnesses.

WALTER EDWARD BARD.

Witnesses:
S. W. KERR,
C. L. O'MAVERTY.